United States Patent
Nakamoto et al.

(10) Patent No.: US 10,770,753 B2
(45) Date of Patent: Sep. 8, 2020

(54) ELECTROLYTE FOR FLUORIDE ION BATTERY AND FLUORIDE ION BATTERY

(71) Applicants: TOYOTA JIDOSHA KABUSHIKI KAISHA, Toyota-shi, Aichi-ken (JP); KYOTO UNIVERSITY, Kyoto-shi, Kyoto-fu (JP)

(72) Inventors: Hirofumi Nakamoto, Kyoto (JP); Zempachi Ogumi, Kyoto (JP); Takeshi Abe, Takatsuki (JP)

(73) Assignees: TOYOTA JIDOSHA KABUSHIKI KAISHA, Toyota (JP); KYOTO UNIVERSITY, Kyoto (JP)

( * ) Notice: Subject to any disclaimer, the term of this patent is extended or adjusted under 35 U.S.C. 154(b) by 371 days.

(21) Appl. No.: 15/071,678

(22) Filed: Mar. 16, 2016

(65) Prior Publication Data
US 2016/0294009 A1   Oct. 6, 2016

(30) Foreign Application Priority Data
Apr. 3, 2015   (JP) .................................. 2015-076905

(51) Int. Cl.
*H01M 10/054* (2010.01)
*H01M 10/0568* (2010.01)
*H01M 10/05* (2010.01)

(52) U.S. Cl.
CPC ....... *H01M 10/0568* (2013.01); *H01M 10/05* (2013.01); *H01M 2300/0025* (2013.01)

(58) Field of Classification Search
CPC ................................................ H01M 10/0568
See application file for complete search history.

(56) References Cited

U.S. PATENT DOCUMENTS

| 6,306,540 | B1 * | 10/2001 | Hiroi | H01M 10/052 429/188 |
| 2007/0231702 | A1 * | 10/2007 | Fujita | B60L 11/123 429/247 |
| 2009/0023074 | A1 | 1/2009 | Matsui et al. | |
| 2009/0029237 | A1 | 1/2009 | Yazami | |
| 2012/0270076 | A9 * | 10/2012 | Yazami | H01M 4/38 429/50 |
| 2015/0357846 | A1 * | 12/2015 | Chen | H01M 4/133 320/128 |

FOREIGN PATENT DOCUMENTS

| CN | 101164189 A | 4/2008 |
| EP | 1058331 A1 | 12/2000 |
| JP | H02-201815 A | 8/1990 |
| JP | 2013-145758 A | 7/2013 |

* cited by examiner

*Primary Examiner* — Stephan J Essex
(74) *Attorney, Agent, or Firm* — Oliff PLC

(57) ABSTRACT

The object of the present invention is to provide an electrolyte for a fluoride ion battery with high activity for fluoridating an active material. The present invention solves the problem by providing an electrolyte for a fluoride ion battery comprising a fluoride complex salt as at least one of $LiPF_6$ and $LiBF_4$, and an organic solvent; and B/A is 0.125 or more in the case where a substance amount of the organic solvent is regarded as A (mol) and a substance amount of the fluoride complex salt is regarded as B (mol).

1 Claim, 8 Drawing Sheets

ELECTROLYTE FOR FLUORIDE ION BATTERY AND FLUORIDE ION BATTERY

TECHNICAL FIELD

The present invention relates to an electrolyte for a fluoride ion battery with high activity for fluoridating an active material.

BACKGROUND ART

For example, a Li ion battery is known as a high-voltage and high-energy density battery. The Li ion battery is a cation-based battery utilizing a reaction between a Li ion and a cathode active material and a reaction between a Li ion and an anode active material. On the other hand, a fluoride ion battery utilizing a reaction of a fluoride ion is known as an anion-based battery.

For example, in Patent Literature 1, an electrochemical cell (a fluoride ion battery) provided with a cathode, an anode and an electrolyte capable of conducting an anion charge carrier (F$^-$) is disclosed. Also, in paragraph [0021] of Patent Literature 1, it is disclosed that the electrolyte contains a solvent and a fluoride salt, which is $MF_n$ (M is alkali metals such as Na, K and Rb, or alkaline earth metals such as Mg, Ca and Sr). Also, in paragraph [0030] of Patent Literature 1, various compounds such as carbonates are disclosed as the solvent.

CITATION LIST

Patent Literature

Patent Literature 1: Japanese Patent Application Laid-Open No. 2013-145758

SUMMARY OF INVENTION

Technical Problem

The problem is that a fluoride anion such as a fluoride ion is so low in stability that activity for fluoridating an active material is low. In other words, the problem is that a fluoride anion is so high in reactivity as to be incapable of sufficiently reacting with an active material by reason of reacting with another material (particularly an organic solvent) before reacting with an active material.

Incidentally, fluoride ions (F$^-$) conduct singly with difficulty and occasionally conduct as fluoride anions (such as fluoride complex anions). In consideration of this point, in the present invention, the term of fluoride anions is used.

The present invention has been made in view of the actual circumstances, and the main object thereof is to provide an electrolyte for a fluoride ion battery with high activity for fluoridating an active material.

Solution to Problem

To achieve the object, the present invention provides an electrolyte for a fluoride ion battery comprising a fluoride complex salt as at least one of LiPF$_6$ and LiBF$_4$, and an organic solvent, wherein B/A is 0.125 or more in the case where a substance amount of the organic solvent is regarded as A (mol) and a substance amount of the fluoride complex salt is regarded as B (mol).

According to the present invention, the electrolyte for a fluoride ion battery with high activity for fluoridating an active material may be obtained by greatly raising the ratio of the fluoride complex salt to the solvent.

In the invention, the B/A is preferably 1 or less.

In the invention, the electrolyte for a fluoride ion battery preferably further comprises a fluoride salt.

In the invention, the fluoride salt is preferably at least one of LiF, NaF and CsF.

In the invention, C/A is preferably within a range of 0.05 to 0.125 in the case when a substance amount of the fluoride salt is regarded as C (mol).

Also, the present invention provides a fluoride ion battery comprising a cathode active material layer, an anode active material layer, and an electrolyte layer formed between the cathode active material layer and the anode active material layer, wherein the electrolyte layer contains the electrolyte for a fluoride ion battery described above.

According to the present invention, the use of the electrolyte for a fluoride ion battery described above allows the fluoride ion battery with a large capacity.

Advantageous Effects of Invention

An electrolyte for a fluoride ion battery of the present invention produces the effect such as to allow high activity for fluoridating an active material.

DESCRIPTION OF EMBODIMENTS

Figure 1:
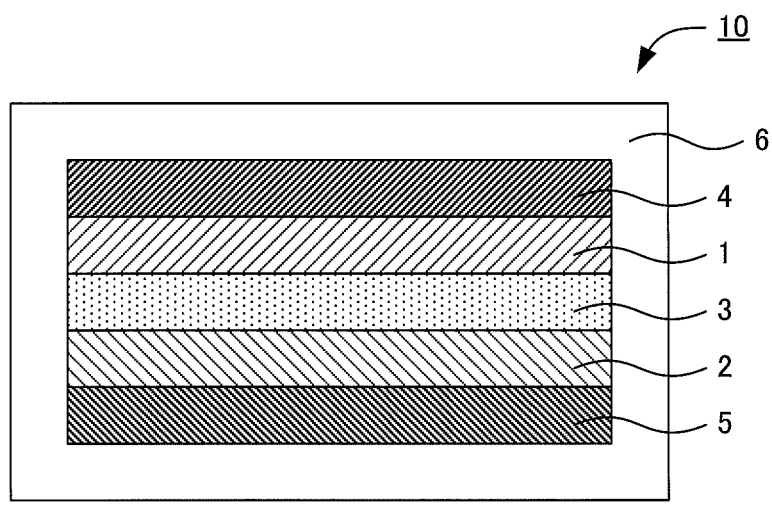
FIG. 1 is a schematic cross-sectional view showing an example of a fluoride ion battery of the present invention.

An electrolyte for a fluoride ion battery and a fluoride ion battery of the present invention are hereinafter described in detail.

A. Electrolyte for Fluoride Ion Battery

The electrolyte for a fluoride ion battery of the present invention is an electrolyte for a fluoride ion battery comprising a fluoride complex salt as at least one of LiPF$_6$ and LiBF$_4$, and an organic solvent, wherein B/A is 0.125 or more in the case when a substance amount of the organic solvent is regarded as A (mol) and a substance amount of the fluoride complex salt is regarded as B (mol).

According to the present invention, the electrolyte for a fluoride ion battery with high activity for fluoridating an active material may be obtained by greatly raising the ratio of the fluoride complex salt to the solvent. The reason therefor is guessed to be that higher ratio of the fluoride complex salt decreases the free organic solvent (in the strict sense, the solvent molecule), which does not solvate with the fluoride complex salt, and allows the free organic solvent to be restrained from reacting with a fluoride anion derived from the fluoride complex salt. When the free organic solvent reacts with a fluoride anion derived from the fluoride complex salt, the fluorination of the active material is caused with difficulty for the reason that $F^-$ does not separate from the organic solvent in the vicinity of an electrode. On the contrary, in the present invention, the decrease of the free organic solvent allows the free organic solvent to be restrained from reacting with a fluoride anion derived from the fluoride complex salt, and allows the electrolyte for a fluoride ion battery with high activity for fluoridating an active material.

Also, in the present invention, the ratio of the fluoride complex salt to the solvent is greatly raised. For example, in the field of a Li ion battery, a liquid electrolyte such that a fluoride complex salt ($LiPF_6$, $LiBF_4$) is dissolved in a solvent is known. This liquid electrolyte was a liquid electrolyte intended for Li ion conduction, and the molar ratio of the fluoride complex salt to the solvent was approximately 0.10 at the maximum (solvent:fluoride complex salt=10:1). Provisionally, even though such a liquid electrolyte for a Li ion battery is directly diverted to the use for a fluoride ion battery, activity for fluoridating an active material may not be improved. Incidentally, it is known that too high supporting salt concentration in the liquid electrolyte for a Li ion battery increases the viscosity of the liquid electrolyte and thus deteriorates Li ion conductivity adversely.

Also, in the present invention, activity for fluoridating an active material may be improved by raising the ratio of the fluoride complex salt to the solvent. That is to say, the raise of the ratio of the fluoride complex salt may cause a fluoride anion derived from the fluoride complex salt to advance a fluoridation reaction (and a defluoridation reaction) of an active material utilizing this fluoride anion. Such findings are new findings, which have not been known conventionally, and an unexpected effect.

For example, in paragraph [0020] of Patent Literature 1, $BF_4^-$ and $PF_6^-$ are disclosed as the exemplification of an anion charge carrier; in the paragraph, there is a description such that "it is necessary for using an anion charge carrier except a fluoride ion to incorporate a host material appropriate for electrodes of a cathode and an anode, which may store an anion charge carrier during discharge and charge, and provide desired battery voltage and specific capacity". In addition, in paragraph [0009] of Patent Literature 1, it is described that a polyatomic anion charge carrier such as $PF_6^-$ is inserted into and desorbed from an active material in a double carbon battery. As clarified from these descriptions, in paragraph [0020] of Patent Literature 1, the object is such that an anion charge carrier ($BF_4^-$, $PF_6^-$) itself is inserted into and desorbed from an active material, and differs completely from the technical idea of the present invention.

Also, in paragraph [0054] of Patent Literature 1, the following reaction formula is described.

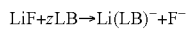

However, this reaction formula only signifies the improvement of solubility of $F^-$, and does not suggest the utilization of a fluoride anion derived from the fluoride complex salt (in the after-mentioned examples, a fluoridation reaction and a defluoridation reaction of an active material are caused even in the case of not using LiF, for example).

Also, in paragraph [0070] of Patent Literature 1, PC-DME-$LiBF_4$ is used as the liquid electrolyte. However, the concentration of $LiBF_4$ is not described nor suggested. In addition, in paragraph [0073] of Patent Literature 1, the following reaction formula is described.

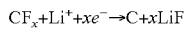

As clarified from this reaction formula, persistently, $LiBF_4$ contained in the liquid electrolyte only provides Li as a counter cation of $F^-$, and differs completely from the technical idea of the present invention.

The electrolyte for a fluoride ion battery of the present invention is hereinafter described in each constitution.

1. Fluoride Complex Salt and Fluoride Salt

The electrolyte for a fluoride ion battery of the present invention ordinarily comprises a fluoride complex salt as at least one of $LiPF_6$ and $LiBF_4$. The fluoride complex salt signifies a salt having a fluoride complex anion, in which a fluoride ion is coordinated to a central element (P, B), as an anion component.

On the other hand, the electrolyte for a fluoride ion battery of the present invention may or may not include a fluoride salt. In particular, in the case of including a fluoride salt, the electrolyte for a fluoride ion battery with higher activity for fluoridating an active material is obtained. The fluoride salt signifies a salt having a fluoride ion as an anion component. The fluoride salt may be an organic fluoride salt, an inorganic fluoride salt or an ionic liquid.

Examples of a cation of the fluoride salt include an alkali metal element. In this case, the fluoride salt may be represented by MF (M is an alkali metal element). Examples of the alkali metal element include Li, Na, K, Rb and Cs; among them, Li, Na and Cs are preferable.

Other examples of a cation of the fluoride salt include a complex cation. Examples of the complex cation include alkylammonium cation, alkylphosphonium cation and alkylsulfonium cation. Examples of the alkylammonium cation include a cation represented by a general formula $NR^1R^2R^3R^4$. In the general formula, $R^1$ to $R^4$ are each independently an alkyl group or a fluoroalkyl group. The carbon number of $R^1$ to $R^4$ is, for example, 10 or less, and may be 5 or less or 3 or less.

2. Organic Solvent

The organic solvent in the present invention is ordinarily a solvent for dissolving a fluoride complex salt and a fluoride salt.

Examples of the organic solvent include a nonaqueous solvent. Examples thereof include cyclic carbonates such as ethylene carbonate (EC), fluoroethylene carbonate (FEC), difluoroethylene carbonate (DFEC), propylene carbonate (PC) and butylene carbonate (BC), chain carbonates such as dimethyl carbonate (DMC), diethyl carbonate (DEC) and ethyl methyl carbonate (EMC), chain ethers such as diethyl ether, 1,2-dimethoxymethane and 1,3-dimethoxypropane, cyclic ethers such as tetrahydrofuran and 2-methyltetrahydrofuran, cyclic sulfones such as sulfolane, chain sulfones such as dimethyl sulfoxide (DMSO), cyclic esters such as γ-butyrolactone, nitriles such as acetonitrile, and optional mixtures thereof.

Also, other examples of the chain ethers include glyme represented by a general formula $R^1$—$O(CH_2CH_2O)_n$—$R^2$ ($R^1$ and $R^2$ are each independently an alkyl group with a carbon number of 4 or less, or a fluoroalkyl group with a carbon number of 4 or less, and n is in a range of 2 to 10).

In the general formula, $R^1$ and $R^2$ may be the same or different. Also, the carbon number of $R^1$ or $R^2$ is ordinarily 4 or less, and may be any of 4, 3, 2 and 1. Specific examples of the alkyl group with a carbon number of 4 or less include a methyl group, an ethyl group, a propyl group, an isopropyl group, a butyl group, a sec-butyl group, an isobutyl group and a tert-butyl group. Also, the fluoroalkyl group is a group in which part or all of hydrogen in the alkyl group is substituted with fluorine. Also, in the general formula, "n" is ordinarily in a range of 2 to 10; "n" may be 3 or more. On the other hand, "n" may be 8 or less, or 5 or less.

Specific examples of the glyme include diethylene glycol diethyl ether (G2), triethylene glycol dimethyl ether (G3), tetraethylene glycol dimethyl ether (G4), diethylene glycol dibutyl ether, diethylene glycol methyl ethyl ether, triethylene glycol methyl ethyl ether and triethylene glycol butyl methyl ether.

Other examples of the organic solvent include an ionic liquid. Examples of a cation of the ionic liquid include piperidinium skeleton cation, pyrrolidinium skeleton cation, imidazolium skeleton cation, ammonium cation and phosphonium cation.

Examples of an anion of the ionic liquid include amide anions typified by bisfluorosulfonylamide(FSA)anion and bistrifluoromethanesulfonylamide(TFSA)anion, phosphate anions typified by hexafluorophosphate anion and tris(pentafluoroethyl)trifluorophosphate anion, tetrafluoroborate (TFB)anion, and triflate anion.

The melting point of the organic solvent is, for example, 100° C. or less, and may be 80° C. or less, 60° C. or less or 25° C. or less.

3. Electrolyte for Fluoride Ion Battery

The electrolyte for a fluoride ion battery of the present invention comprises at least a fluoride complex salt and an organic solvent, and may further comprise a fluoride salt. Here, a substance amount of the organic solvent in the electrolyte for a fluoride ion battery is regarded as A (mol), a substance amount of the fluoride complex salt is regarded as B (mol), and a substance amount of the fluoride salt is regarded as C (mol). The ratio B/A of the fluoride complex salt to the organic solvent is ordinarily 0.125 or more, and may be 0.17 or more, or 0.20 or more. B/A is, for example, 1 or less, and may be 0.5 or less.

Also, the ratio C/A of the fluoride salt to the organic solvent may be 0 or more than 0. In the case of the latter, C/A is, for example, 0.01 or more, and may be 0.05 or more. In the case of the latter, C/A is, for example, 0.5 or less, and may be 0.125 or less. Also, the ratio C/B of the fluoride salt to the fluoride complex salt may be 0 or more than 0. In the case of the latter, C/B is, for example, 0.05 or more, and may be 0.10 or more. In the case of the latter, C/B is, for example, 1 or less, and may be 0.46 or less.

The melting point of the electrolyte for a fluoride ion battery of the present invention is, for example, 100° C. or less, and may be 80° C. or less, 60° C. or less or 25° C. or less.

Incidentally, with regard to $F(HF)_x^-$ anion, $F^-$ dissociates from HF with difficulty. Thus, an active material is occasionally fluoridated sufficiently with difficulty. Incidentally, "x" is a larger real number than 0 and satisfies $0<x\leq5$, for example. Thus, it is preferable that the electrolyte for a fluoride ion battery does not substantially contain $F(HF)_x^-$ anion. "Not substantially contain $F(HF)_x^-$ anion" signifies that the ratio of $F(HF)_x^-$ anion to all anions existing in the electrolyte is 0.5 mol % or less. The ratio of $F(HF)_x^-$ anion is preferably 0.3 mol % or less.

B. Fluoride Ion Battery

FIG. 1 is a schematic cross-sectional view showing an example of the fluoride ion battery of the present invention. A fluoride ion battery 10 shown in FIG. 1 has a cathode active material layer 1, an anode active material layer 2, an electrolyte layer 3 formed between the cathode active material layer 1 and the anode active material layer 2, a cathode current collector 4 for collecting the cathode active material layer 1, an anode current collector 5 for collecting the anode active material layer 2, and a battery case 6 for storing these members. Also, the electrolyte layer 3 contains the above described "A. Electrolyte for fluoride ion battery".

According to the present invention, the use of the electrolyte for a fluoride ion battery described above allows the fluoride ion battery with a large capacity.

The fluoride ion battery of the present invention is hereinafter described in each constitution.

1. Electrolyte Layer

The electrolyte layer in the present invention is a layer formed between the cathode active material layer and the anode active material layer. In the present invention, the electrolyte layer contains the electrolyte for a fluoride ion battery described above. The thickness of the electrolyte layer varies greatly with constitutions of the battery, and is not particularly limited.

2. Cathode Active Material Layer

The cathode active material layer in the present invention is a layer containing at least the cathode active material. Also, the cathode active material layer may further contain at least one of a conductive material and a binder except the cathode active material.

The cathode active material in the present invention is ordinarily an active material which is defluoridated during discharge. Examples of the cathode active material include metal simple substance, alloy, metal oxide, and fluorides thereof. Examples of metallic element contained in the cathode active material include Cu, Ag, Ni, Co, Pb, Ce, Mn, Au, Pt, Rh, V, Os, Ru, Fe, Cr, Bi, Nb, Sb, Ti, Sn and Zn. Above all, the cathode active material is preferably Cu, $CuF_x$, Fe, $FeF_x$, Ag and $AgF_x$. Incidentally, the "x" is a larger real number than 0. Also, other examples of the cathode active material include a carbon material and fluorides thereof. Examples of the carbon material include graphite, coke and carbon nanotube. Also, further examples of the cathode active material include a polymer material. Examples of the polymer material include polyaniline, polypyrrole, polyacetylene and polythiophene.

The conductive material is not particularly limited if the material has desired electron conduction, but examples thereof include a carbon material. Examples of the carbon material include carbon black such as acetylene black, Ketjen Black, furnace black and thermal black. On the other hand, the binder is not particularly limited if the binder is chemically and electrically stable, but examples thereof include fluorine-based binders such as polyvinylidene fluoride (PVDF) and polytetrafluoroethylene (PTFE). Also, the content of the cathode active material in the cathode active material layer is preferably larger from the viewpoint of capacity. Also, the thickness of the cathode active material layer varies greatly with constitutions of the battery, and is not particularly limited.

3. Anode Active Material Layer

The anode active material layer in the present invention is a layer containing at least the anode active material. Also, the anode active material layer may further contain at least one of a conductive material and a binder except the anode active material.

The anode active material in the present invention is ordinarily an active material which is fluoridated during discharge. Also, an optional active material having lower potential than the cathode active material may be selected for the anode active material. Thus, the cathode active material described above may be used as the anode active material. Examples of the anode active material include metal simple substance, alloy, metal oxide, and fluorides thereof. Examples of metallic element contained in the anode active material include La, Ca, Al, Eu, Li, Si, Ge, Sn, In, V, Cd, Cr, Fe, Zn, Ga, Ti, Nb, Mn, Yb, Zr, Sm, Ce, Mg and Pb. Above all, the anode active material is preferably Mg, $MgF_x$, Al, $AlF_x$, Ce, $CeF_x$, Ca, $CaF_x$, Pb and $PbF_x$. Incidentally, the "x" is a larger real number than 0. Also, the carbon material and the polymer material described above may be used as the anode active material.

The same material as the material described in the above-described cathode active material layer may be used for the conductive material and the binder. Also, the content of the anode active material in the anode active material layer is preferably larger from the viewpoint of capacity. Also, the thickness of the anode active material layer varies greatly with constitutions of the battery, and is not particularly limited.

4. Other Constitutions

The fluoride ion battery of the present invention has at least the anode active material layer, the cathode active material layer and the electrolyte layer described above, ordinarily further has a cathode current collector for collecting the cathode active material layer and an anode current collector for collecting the anode active material layer. Examples of the shape of the current collectors include a foil shape, a mesh shape and a porous shape. Also, the fluoride ion battery of the present invention may have a separator between the cathode active material layer and the anode active material layer. The reason therefor is to allow the battery with higher safety.

5. Fluoride Ion Battery

The fluoride ion battery of the present invention is not particularly limited if the battery has the cathode active material layer, the anode active material layer and the electrolyte layer described above. Also, the fluoride ion battery of the present invention may be a primary battery or a secondary battery, preferably a secondary battery among them. The reason therefor is to be repeatedly charged and discharged and be useful as a car-mounted battery, for example. Also, examples of the shape of the fluoride ion battery of the present invention include a coin shape, a laminate shape, a cylindrical shape and a rectangular shape.

Incidentally, the present invention is not limited to the embodiments. The embodiments are exemplification, and any is included in the technical scope of the present invention if it has substantially the same constitution as the technical idea described in the claim of the present invention and offers similar operation and effect thereto.

EXAMPLES

The present invention is described more specifically by showing examples hereinafter. Incidentally, the test portions were all produced in a glove box under an Ar atmosphere.

Example 1

Triglyme (G3, triethylene glycol dimethyl ether, manufactured by KANTO CHEMICAL CO., INC.) and lithium hexafluorophosphate ($LiPF_6$, manufactured by KISHIDA CHEMICAL Co., Ltd.) were weighed so as to be a molar ratio of G3:$LiPF_6$=4:1, and stirred in a hermetically sealed vessel made of fluororesin on the conditions of 30° C. and 24 hours or more to obtain an evaluation electrolyte.

Example 2

An evaluation electrolyte was obtained in the same manner as Example 1 except for modifying the molar ratio of G3 and $LiPF_6$ to G3:$LiPF_6$=6:1.

Example 3

An evaluation electrolyte was obtained in the same manner as Example 1 except for replacing G3 with propylene carbonate (PC, manufactured by KISHIDA CHEMICAL Co., Ltd.).

Example 4

An evaluation electrolyte was obtained in the same manner as Example 3 except for modifying the molar ratio of PC and $LiPF_6$ to PC:$LiPF_6$=8:1.

Example 5

An evaluation electrolyte was obtained in the same manner as Example 1 except for replacing G3 with tetraglyme (G4, tetraethylene glycol dimethyl ether, manufactured by KISHIDA CHEMICAL Co., Ltd.) and modifying the molar ratio of G4 and $LiPF_6$ to G4:$LiPF_6$=5:1.

Example 6

A mixed solvent, in which ethylene carbonate (EC, manufactured by KISHIDA CHEMICAL Co., Ltd.) and dimethyl carbonate (DMC, manufactured by KISHIDA CHEMICAL Co., Ltd.) are mixed by the same volume, and lithium hexafluorophosphate ($LiPF_6$, manufactured by KISHIDA CHEMICAL Co., Ltd.) were weighed so as to be a molar ratio of mixed solvent:$LiPF_6$=4:1, and stirred in a hermetically sealed vessel made of fluororesin on the conditions of 60° C. and 24 hours or more to obtain an evaluation electrolyte.

Example 7

An evaluation electrolyte was obtained in the same manner as Example 6 except for replacing the mixed solvent with sulfolane (SL, manufactured by KISHIDA CHEMICAL Co., Ltd.) and modifying the molar ratio of SL and $LiPF_6$ to SL:$LiPF_6$=5:1.

Example 8

Triglyme (G3, triethylene glycol dimethyl ether, manufactured by KANTO CHEMICAL CO., INC.), lithium hexafluorophosphate ($LiPF_6$, manufactured by KISHIDA CHEMICAL Co., Ltd.) and lithium fluoride (LiF, manufactured by Wako Pure Chemical Industries, Ltd.) were weighed so as to be a molar ratio of G3:$LiPF_6$:LiF=20:5:1, and stirred in a hermetically sealed vessel made of fluororesin on the conditions of 30° C. and 100 hours or more to obtain an evaluation electrolyte.

Example 9

Tetraglyme (G4, tetraethylene glycol dimethyl ether, manufactured by KISHIDA CHEMICAL Co., Ltd.), lithium tetrafluoroborate (LiBF$_4$, manufactured by KISHIDA CHEMICAL Co., Ltd.) and cesium fluoride (CsF, manufactured by KANTO CHEMICAL CO., INC.) were weighed so as to be a molar ratio of G4:LiBF$_4$:CsF=10:10:1, and stirred in a hermetically sealed vessel made of fluororesin on the conditions of 30° C. and 72 hours or more to obtain an evaluation electrolyte.

Example 10

Propylene carbonate (PC, manufactured by KISHIDA CHEMICAL Co., Ltd.), lithium hexafluorophosphate (LiPF$_6$, manufactured by KISHIDA CHEMICAL Co., Ltd.) and lithium fluoride (LiF, manufactured by Wako Pure Chemical Industries, Ltd.) were weighed so as to be a molar ratio of PC:LiPF$_6$:LiF=8:2.2:1, and stirred in a hermetically sealed vessel made of fluororesin on the conditions of 30° C. and 100 hours or more to obtain an evaluation electrolyte.

Example 11

An evaluation electrolyte was obtained in the same manner as Example 10 except for replacing LiF with sodium fluoride (NaF, manufactured by Alfa Aesar).

Comparative Example 1

An evaluation electrolyte was obtained in the same manner as Example 1 except for modifying the molar ratio of G3 and LiPF$_6$ to G3:LiPF$_6$=10:1.

Comparative Example 2

An evaluation electrolyte was obtained in the same manner as Example 3 except for modifying the molar ratio of PC and LiPF$_6$ to PC:LiPF$_6$=11.8:1. Incidentally, the concentration of LiPF$_6$ corresponds to 1 M.

Comparative Example 3

Triglyme (G3, triethylene glycol dimethyl ether, manufactured by KANTO CHEMICAL CO., INC.) and lithium bistrifluoromethane sulfonylamide (LiTFSA, manufactured by KISHIDA CHEMICAL Co., Ltd.) were weighed so as to be a molar ratio of G3:LiTFSA=4:1, and stirred in a hermetically sealed vessel made of fluororesin on the conditions of 30° C. and 24 hours or more to obtain an evaluation electrolyte. The compositions of the evaluation electrolytes obtained in Examples 1 to 11 and Comparative Examples 1 to 3 are shown in Table 1. A in Table 1 is a substance amount of the organic solvent, B is a substance amount of the fluoride complex salt, and C is a substance amount of the fluoride salt.

TABLE 1

| | Composition | B/A | C/A | C/B |
|---|---|---|---|---|
| Example 1 | G3:LiPF$_6$ = 4:1 | 0.250 | 0 | 0 |
| Example 2 | G3:LiPF$_6$ = 6:1 | 0.167 | 0 | 0 |
| Example 3 | PC:LiPF$_6$ = 4:1 | 0.250 | 0 | 0 |
| Example 4 | PC:LiPF$_6$ = 8:1 | 0.125 | 0 | 0 |
| Example 5 | G4:LiPF$_6$ = 5:1 | 0.200 | 0 | 0 |
| Example 6 | EC + DMC:LiPF$_6$ = 4:1 | 0.250 | 0 | 0 |
| Example 7 | SL:LiPF$_6$ = 5:1 | 0.200 | 0 | 0 |
| Example 8 | G3:LiPF$_6$:LiF = 20:5:1 | 0.250 | 0.050 | 0.200 |
| Example 9 | G4:LiBF$_4$:CsF = 10:10:1 | 1.000 | 0.100 | 0.100 |
| Example 10 | PC:LiPF$_6$:LiF = 8:2.2:1 | 0.275 | 0.125 | 0.455 |
| Example 11 | PC:LiPF$_6$:NaF = 8:2.2:1 | 0.275 | 0.125 | 0.455 |

TABLE 1-continued

| | Composition | B/A | C/A | C/B |
|---|---|---|---|---|
| Comparative Example 1 | G3:LiPF$_6$ = 10:1 | 0.100 | 0 | 0 |
| Comparative Example 2 | PC:LiPF$_6$ = 11.8:1 | 0.085 | 0 | 0 |
| Comparative Example 3 | G3:LiTFSA = 4:1 | — | — | — |

[Evaluations]
(Cyclic Voltammetry Measurement)

CV measurement was performed for the evaluation electrolytes obtained in Examples 1 to 11 and Comparative Examples 1 to 3. Specifically, an evaluation was performed in a glove box under an Ar atmosphere by using a dip three-electrode cell. An Al plate was used for a working electrode, and a mixture electrode of PTFE, acetylene black (AB) and fluorocarbon was used for a counter electrode. Incidentally, the mixture electrode is an electrode containing at a weight ratio of PTFE:AB:fluorocarbon=1:2:7. Also, a reference electrode was isolated from the evaluation electrolyte by using Vycor glass. Incidentally, an Ag line immersed in an acetonitrile solution, in which silver nitrate and tetrabutylammonium perchlorate were each dissolved at a concentration of 0.1 M, was used for the reference electrode. Also, the measurement was performed on the conditions of room temperature and a sweep rate of 1 mV/s. Incidentally, the evaluation electrolytes obtained in Examples 1 to 6 and 8 to 11 and Comparative Examples 1 to 3 were liquid at room temperature (25° C.), and the evaluation electrolyte obtained in Example 7 was solid at room temperature. Thus, the electrolyte for a fluoride ion battery of the present invention may be liquid or solid at room temperature.

Figure 2A:
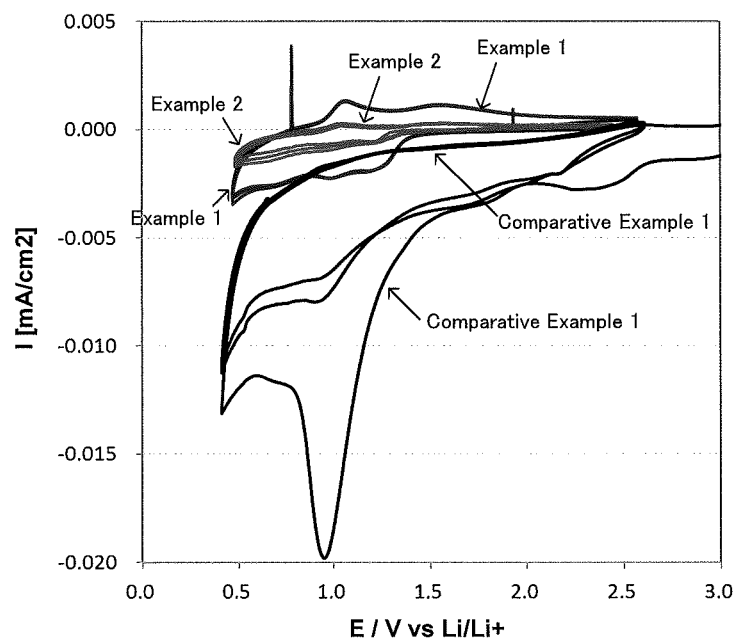
FIGS. 2A to 2D are results of CV measurement for evaluation electrolytes obtained in Examples 1 and 2 and Comparative Example 1.
Figure 2B:
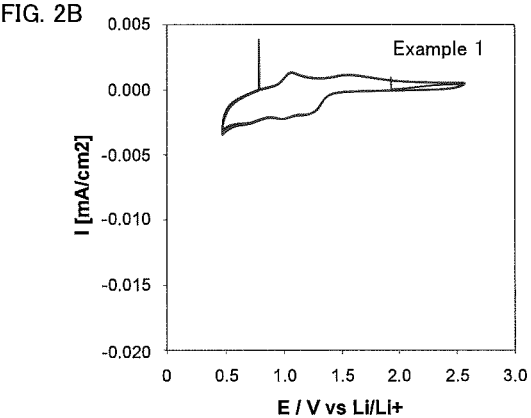
Figure 2D:
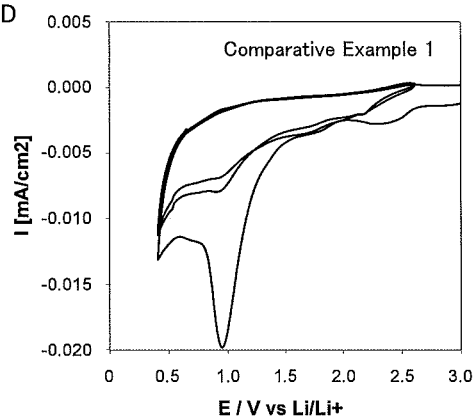
Figure 2C:
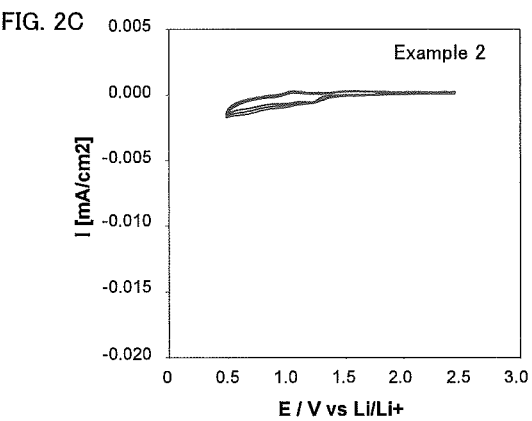
Figure 3:
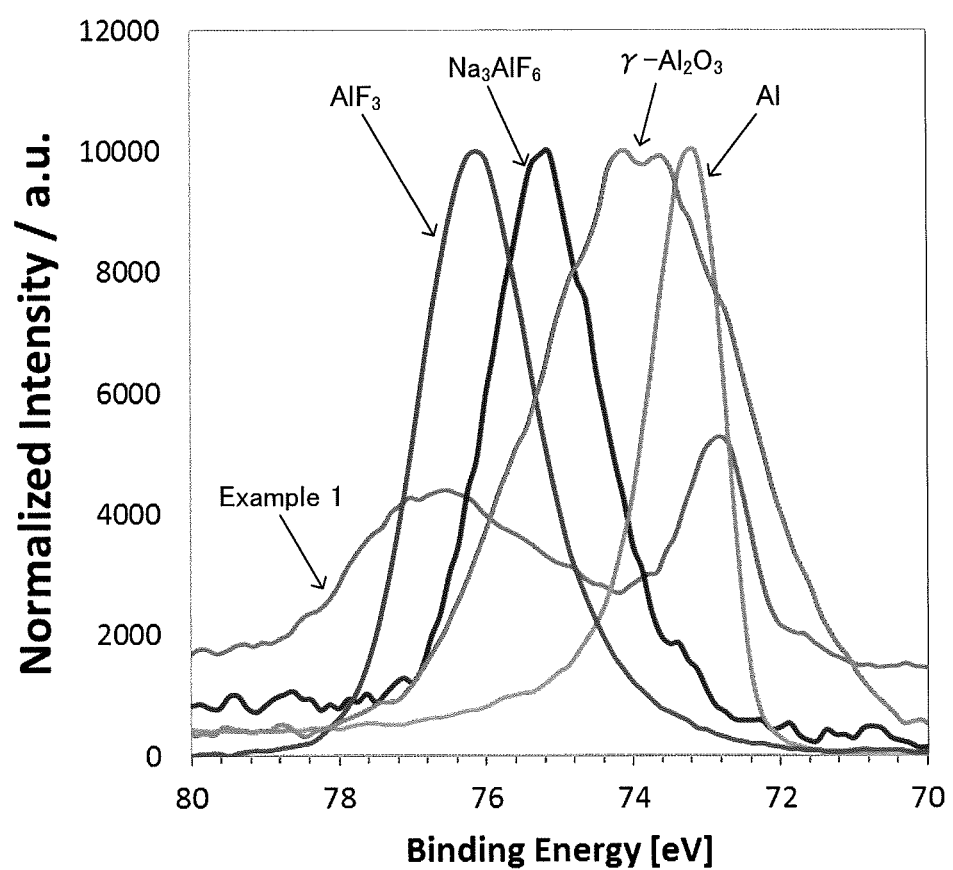
FIG. 3 is a result of XPS measurement for an Al electrode after CV measurement.

First, FIG. 2A is a result of CV measurement for the evaluation electrolyte obtained in Examples 1 and 2 and Comparative Example 1, and FIGS. 2B to 2D show each result separately. As shown in FIGS. 2A to 2D, in Examples 1 and 2, an oxidation current peak in accordance with fluoridation of Al in the vicinity of 1.1 V, and a reduction current peak in accordance with defluoridation of Al fluoride in the vicinity of 0.7 V were confirmed. Incidentally, the theoretical potential of fluoridation and defluoridation reaction of Al is 0.9 V. On the other hand, in Comparative Example 1, these current peaks were not confirmed. Also, XPS measurement (Al2p) was performed for the Al electrode after the CV measurement. The result is shown in FIG. 3. As shown in FIG. 3, in Example 1, a peak of aluminum reverting to AlF$_3$ was confirmed. It was confirmed from these results that fluoridation reaction and defluoridation reaction of Al were electrochemically caused in Examples 1 and 2. In particular, Al is a useful active material exhibiting theoretical potential: −2.14 V and gravimetric and volumetric energy density: 957 Ah/kg.

Figure 4A:
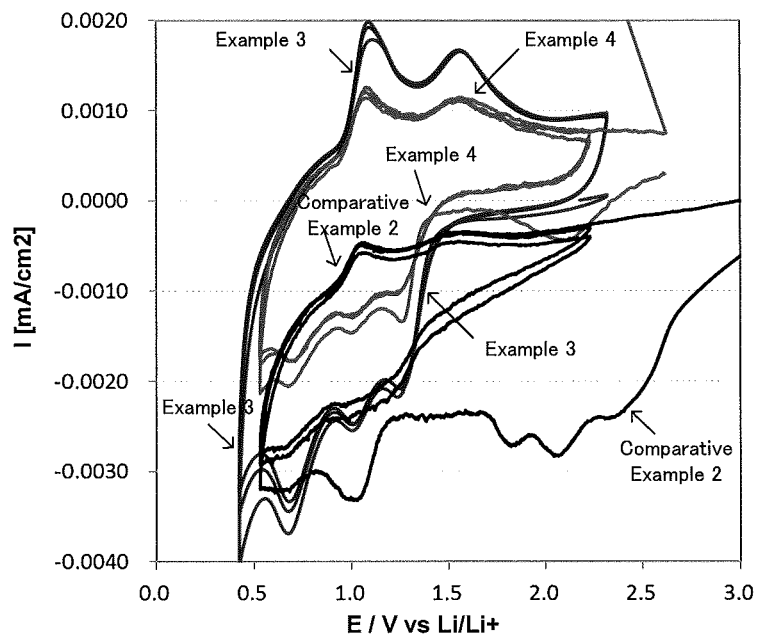
FIGS. 4A to 4D are results of CV measurement for evaluation electrolytes obtained in Examples 3 and 4 and Comparative Example 2.
Figure 4B:
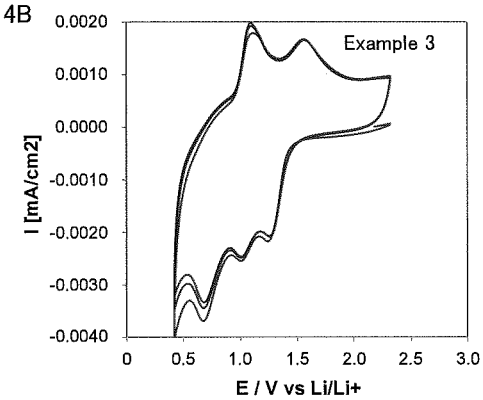
Figure 4D:
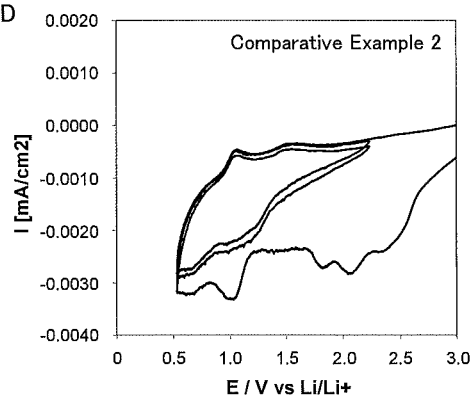
Figure 4C:
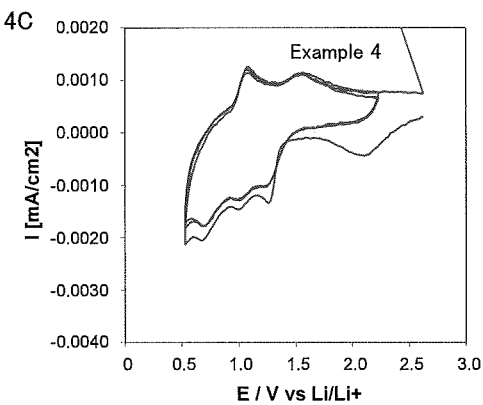

Next, FIG. 4A is a result of CV measurement for the evaluation electrolyte obtained in Examples 3 and 4 and Comparative Example 2, and FIGS. 4B to 4D show each result separately. As shown in FIGS. 4A to 4D, in Examples 3 and 4, an oxidation current peak in accordance with fluoridation of Al in the vicinity of 1.1 V, and a reduction current peak in accordance with defluoridation of Al fluoride in the vicinity of 0.7 V were confirmed. On the other hand, in Comparative Example 2, an oxidation current peak in accordance with fluoridation of Al in the vicinity of 1.1 V was not confirmed. It was shown from the results of FIGS. 2A to 4D that the electrolyte was useful as an electrolyte for a fluoride ion battery when increasing the ratio of the fluoride complex salt.

Figure 5:
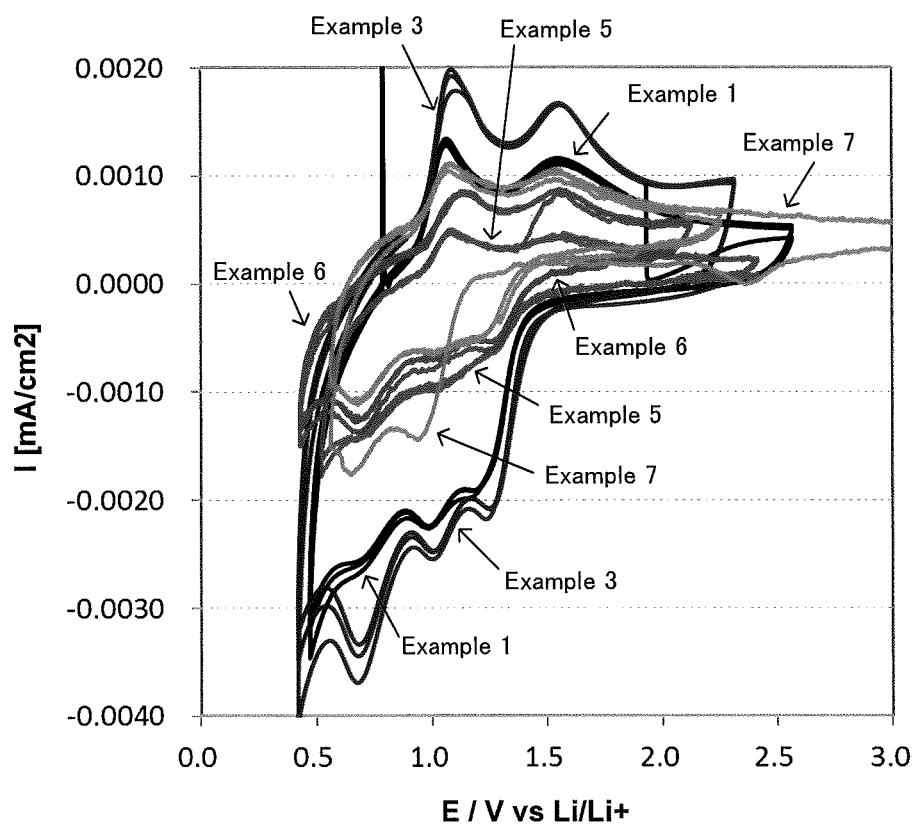
FIG. 5 is a result of CV measurement for evaluation electrolytes obtained in Examples 1, 3 and 5 to 7.
Figure 6A:
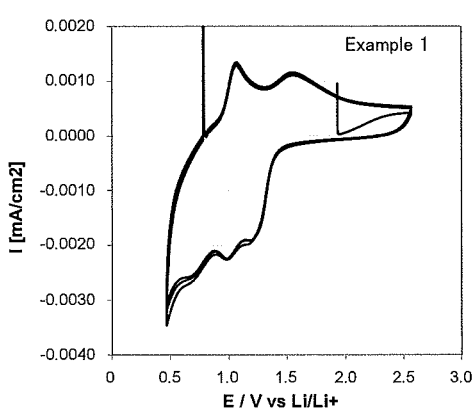
FIGS. 6A to 6E are results of CV measurement for evaluation electrolytes obtained in Examples 1, 3 and 5 to 7.
Figure 6D:
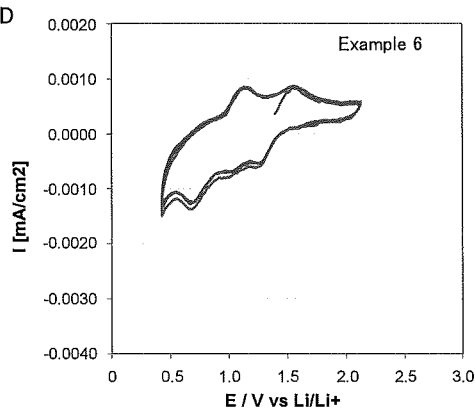
Figure 6B:
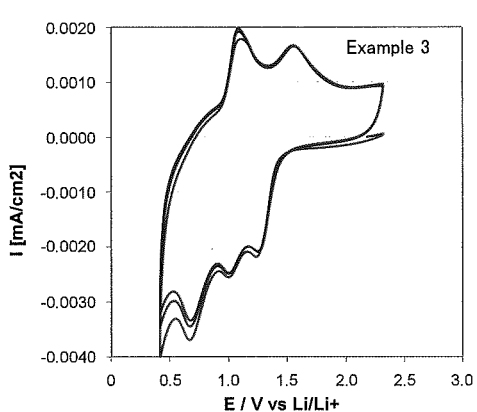
Figure 6E:
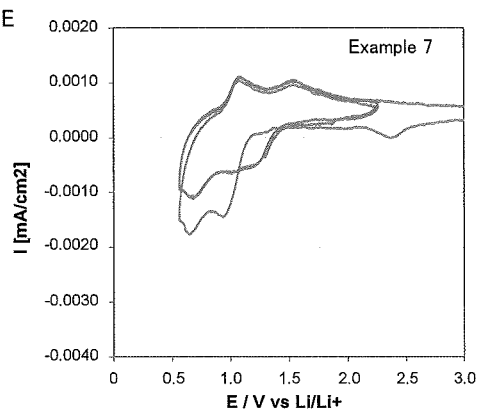
Figure 6C:
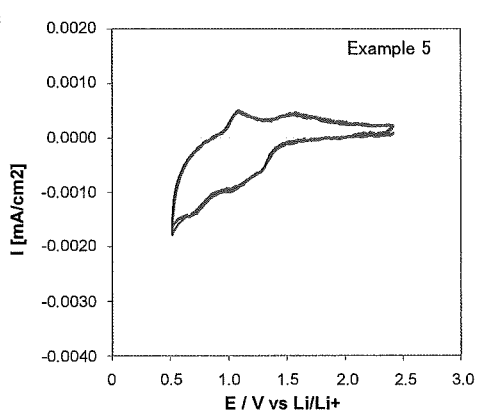

Next, FIG. 5 is a result of CV measurement for the evaluation electrolyte obtained in Examples 1, 3 and 5 to 7, and FIGS. 6A to 6E show each result separately. As shown in FIGS. 5 and 6A to 6E, in Examples 1, 3 and 5 to 7, an oxidation current peak in accordance with fluoridation of Al in the vicinity of 1.1 V, and a reduction current peak in accordance with defluoridation of Al fluoride in the vicinity of 0.7 V were confirmed. Thus, it was confirmed that fluoridation reaction and defluoridation reaction were caused irrespective of kinds of the organic solvents when increasing the ratio of the fluoride complex salt.

Figure 7A:
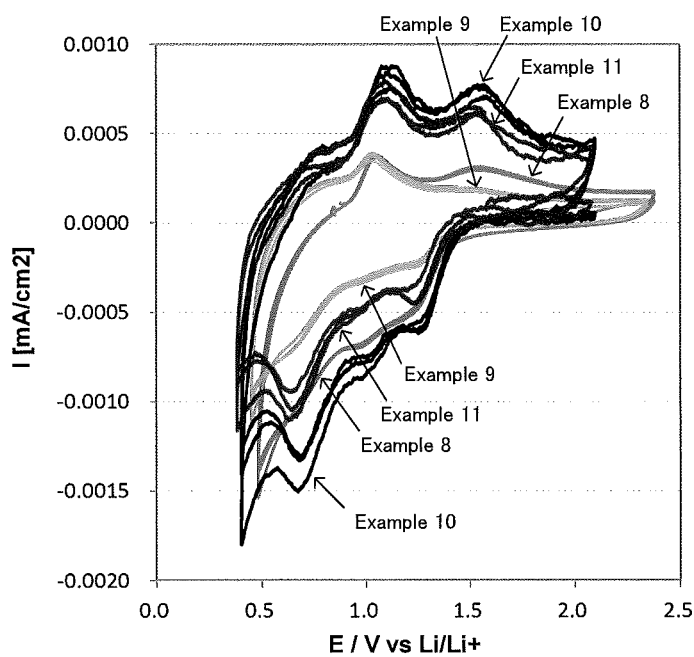
FIGS. 7A to 7E are results of CV measurement for evaluation electrolytes obtained in Examples 8 to 11.
Figure 7B:
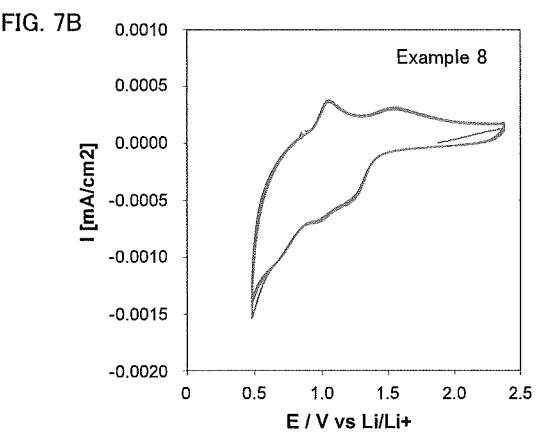
Figure 7C:
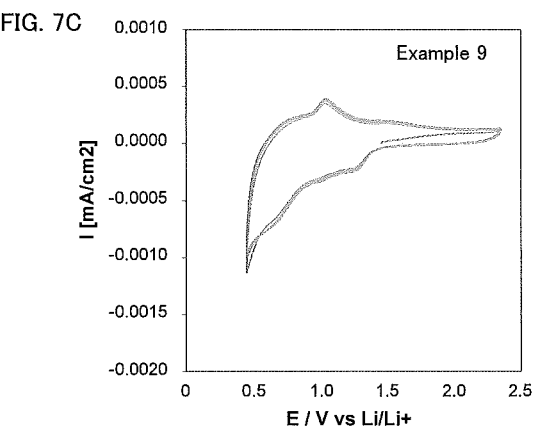
Figure 7D:
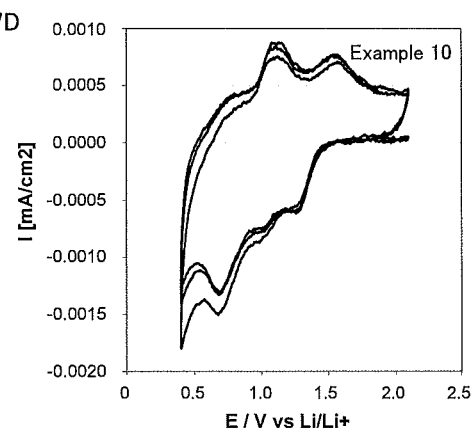
Figure 7E:
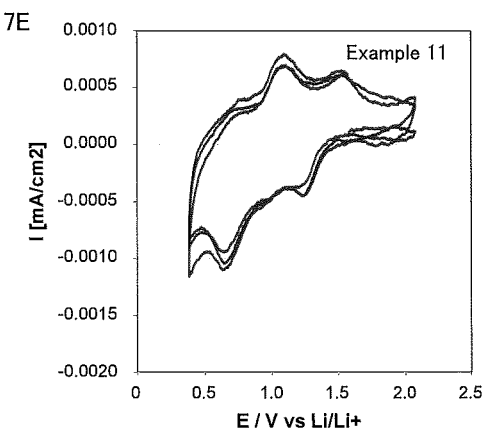

Next, FIG. 7A is a result of CV measurement for the evaluation electrolyte obtained in Examples 8 to 11, and FIGS. 7B to 7E show each result separately. As shown in FIGS. 7A to 7E, in Examples 8 to 11, an oxidation current peak in accordance with fluoridation of Al in the vicinity of 1.1 V, and a reduction current peak in accordance with defluoridation of Al fluoride in the vicinity of 0.7 V were confirmed. Thus, it was confirmed that the evaluation electrolyte functioned as the electrolyte for a fluoride ion battery when increasing the ratio of the fluoride complex salt even when the fluoride salt was added. In addition, it was confirmed that the evaluation electrolyte functioned as the electrolyte for a fluoride ion battery irrespective of kinds of the fluoride salts.

Figure 8A:
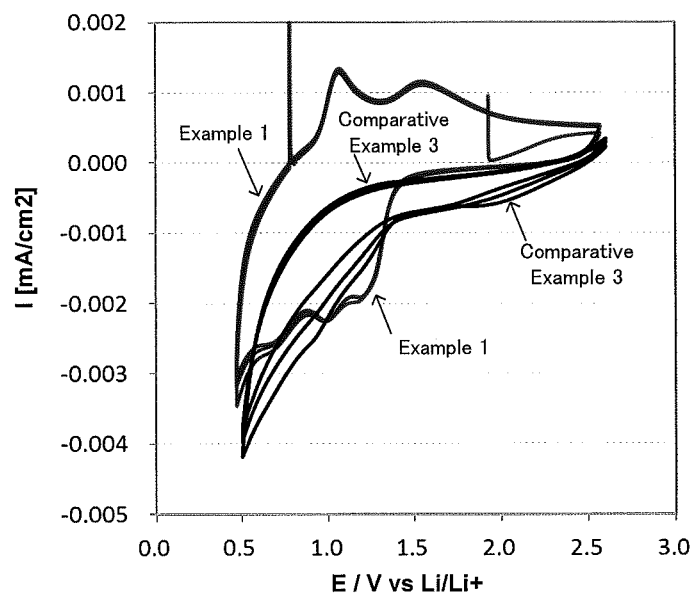
FIGS. 8A to 8C are results of CV measurement for evaluation electrolytes obtained in Example 1 and Comparative Example 3.
Figure 8B:
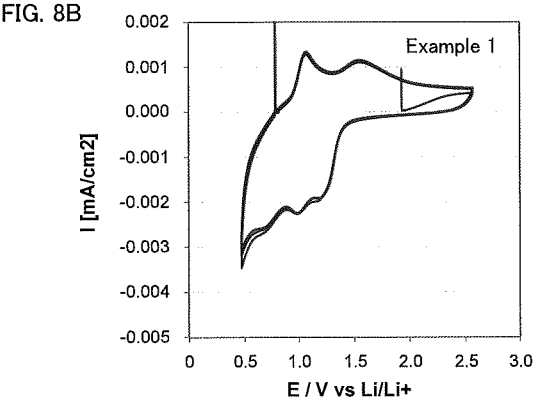
Figure 8C:
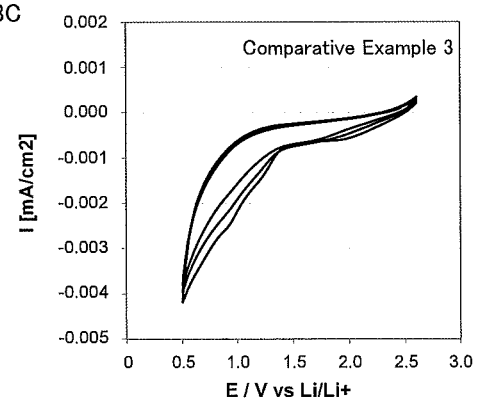

Next, FIG. 8A is a result of CV measurement for the evaluation electrolyte obtained in Example 1 and Comparative Example 3, and FIGS. 8B and 8C show each result separately. As shown in FIGS. 8A to 8C, in Comparative Example 3, an oxidation current peak in accordance with fluoridation of Al in the vicinity of 1.1 V, and a reduction current peak in accordance with defluoridation of Al fluoride in the vicinity of 0.7 V were not confirmed. Thus, it may be confirmed that the effect of the present invention is not obtained by an optional salt but a specific fluoride complex salt is needed.

REFERENCE SIGNS LIST 1 cathode active material layer
2 anode active material layer
3 electrolyte layer
4 cathode current collector
5 anode current collector
6 battery case
10 fluoride ion battery

What is claimed is:

1. A fluoride ion battery comprising a cathode active material layer, an anode active material layer, and an electrolyte layer formed between the cathode active material layer and the anode active material layer, wherein
the cathode active material layer includes a cathode active material comprising at least one kind of metal simple substance, alloy, metal oxide, carbon material, and fluorides thereof, and the cathode active material is an active material that is defluoridated during discharge,
the anode active material layer includes an anode active material comprising at least one kind of metal simple substance, alloy, metal oxide, and fluorides thereof, and the anode active material is an active material that is fluoridated during discharge,
the electrolyte layer includes an electrolyte containing a fluoride complex salt as at least one of $LiPF_6$ and $LiBF_4$, and one or more organic solvents, and the electrolyte layer does not contain a fluoride salt having a fluoride ion as an anion component, and
B/A is 0.125 or more and 1 or less in the case when a total amount of all organic solvents in the electrolyte layer is regarded as A (mol) and a total amount of all the fluoride complex salt in the electrolyte layer is regarded as B (mol).

* * * * *